United States Patent
Zhang et al.

(10) Patent No.: US 7,497,938 B2
(45) Date of Patent: Mar. 3, 2009

(54) TRIBO-CHRONOAMPEROMETRY AS A TOOL FOR CMP APPLICATION

(75) Inventors: Jian Zhang, Aurora, IL (US); Steven K. Grumbine, Aurora, IL (US); Phillip W. Carter, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 807 days.

(21) Appl. No.: 11/088,075

(22) Filed: Mar. 22, 2005

(65) Prior Publication Data

US 2006/0213781 A1    Sep. 28, 2006

(51) Int. Cl.
*B23H 3/02* (2006.01)

(52) U.S. Cl. .................. 205/644; 205/641; 205/645; 205/206; 205/222

(58) Field of Classification Search .............. 205/641, 205/644, 645, 123, 206, 222
See application file for complete search history.

(56) References Cited

U.S. PATENT DOCUMENTS

| | | | |
|---|---|---|---|
| 4,793,895 A | 12/1988 | Kaanta et al. | |
| 5,846,398 A | 12/1998 | Carpio | |
| 6,258,231 B1 | 7/2001 | Easter et al. | |
| 6,379,223 B1 * | 4/2002 | Sun et al. | 451/41 |
| 6,402,592 B1 | 6/2002 | Zhu et al. | |
| 6,673,226 B1 | 1/2004 | Kogan et al. | |
| 6,769,960 B2 | 8/2004 | Sakai | |
| 2004/0152309 A1 * | 8/2004 | Carter et al. | 438/689 |

OTHER PUBLICATIONS

Lee et al., *Materials Research Society Symposium Proceedings*, 767, F2.9.1-F2.9.6 (2003).
Matsui et al., *Advanced Metallization Conference 2000*, 241-246 (2000).

* cited by examiner

*Primary Examiner*—Bruce F Bell
(74) *Attorney, Agent, or Firm*—Thomas E. Omholt; Francis J. Koszyk; Steven D. Weseman

(57) ABSTRACT

The invention provides a method of determining at least one electrochemical characteristic of a chemical-mechanical or electrochemical-mechanical polishing system comprising application of a potential between a polishing substrate and an electrode to generate a current, and determining the at least one electrochemical characteristic by analysis of the current as a function of time.

36 Claims, 3 Drawing Sheets

US 7,497,938 B2

TRIBO-CHRONOAMPEROMETRY AS A TOOL FOR CMP APPLICATION

FIELD OF THE INVENTION

This invention pertains to a method of determining at least one characteristic of a chemical-mechanical or electrochemical-mechanical polishing system.

BACKGROUND OF THE INVENTION

Compositions and methods for planarizing or polishing the surface of a substrate, especially for chemical-mechanical polishing (CMP), are well known in the art. Polishing compositions (also known as polishing slurries) used in CMP processes typically contain an abrasive material in an aqueous solution, and are applied to a surface by contacting the surface with a polishing pad saturated with the polishing composition. Typical abrasive materials include silicon dioxide, cerium oxide, aluminum oxide, zirconium oxide, and tin oxide. The polishing composition is generally used in conjunction with a polishing pad (e.g., polishing cloth or disk). The polishing pad may contain abrasive material in addition to, or instead of, the abrasive material in the polishing composition.

In the semiconductor industry, electric circuits are often fabricated by a process of forming circuit lines on a substrate, typically a dielectric material such as silicon, via the formation of trenches on the substrate surface, followed by application of a barrier layer and then filling of the lined trenches with a metal. Because of the necessity for complete filling of the trenches, the substrate surface is typically coated with a layer of the metal. CMP is then used to polish away the excess of metal down to the dielectric surface or to the barrier layer, thereby leaving metal lines imbedded in the substrate surface.

When applied to metal layers, the CMP process is a combination of abrasion and surface chemistry performed by the chemical components of the polishing composition. Typically, the polishing composition contains components that react chemically with the surface of the metal, converting the metal into a softer, more easily abradable material which is then mechanically removed by the action of abrasive particles suspended in the polishing composition. Since the metal must be completely removed from the surface of the substrate, to prevent interconnections and electrical shorts between adjacent lines, and since generally the metal and underlying barrier layer or dielectric will polish at different rates, the polishing composition must be formulated to remove the metal at an acceptable rate with low defectivity but cannot aggressively overoxidize, or etch, the metal remaining in the trenches, once the polishing process has reached the underlying layer. The over-removal of metal in trenches is referred to as dishing in the art. Thus, there exists a need for methods of optimizing polishing composition chemistry for each given application.

Another challenge in the CMP art is to determine the endpoint of a polishing operation. After removal of a particular material from the substrate surface is complete, it is desirable to terminate the polishing operation, since over-polishing can lead to the aforementioned dishing as well as damage to delicate metal lines on the substrate surface. Because of wafer-to-wafer variability in the depth of metal coating, and because of chemical instability of polishing compositions over time, particularly in polishing compositions comprising oxidizing agents, in a production setting wherein a number of substrates are sequentially polished, the optimal length of time each individual substrate should be polished will vary. Typically, polishing parameters such as polishing time are determined by periodically removing a piece being polished from the polishing process and performing tests to determine the extent and quality of the polishing process at that point, thus allowing development of a polishing protocol. However, due to the aforementioned variability during the polishing process, an unacceptably high number of defective wafers result from overpolishing.

A number of attempts have been made to determine in-process polishing endpoints and to monitor polishing compositions over time. For example, U.S. Pat. No. 5,964,643 describes a polishing system wherein a reflected laser beam is analyzed to determine surface characteristics of a substrate being polished to follow the polishing process in situ. U.S. Pat. No. 6,769,960 describes a system for manufacturing a semiconductor device comprising a measuring apparatus for monitoring a current passing through the polishing composition to detect variations occurring therein over time. However, a need remains for alternative and improved methods for process monitoring in CMP.

BRIEF SUMMARY OF THE INVENTION

The invention provides a method of determining at least one electrochemical characteristic of a chemical-mechanical polishing system comprising (a) a reactive substrate and (b) an aqueous solution, the method comprising (i) providing an electrochemical cell comprising (a) a reactive substrate comprising at least one conductive material, (b) an aqueous solution with a conductivity of about 10 µS or more, and (c) an electrode, wherein the reactive substrate and the electrode are in fluid communication with the aqueous solution, (ii) applying a first potential between the reactive substrate and the electrode wherein the first potential has a value such that substantially no current flows between the reactive substrate and the electrode, (iii) changing the first potential to a second potential, wherein the second potential is greater than the first potential, such that a current is generated between the reactive substrate and the electrode, (iv) collecting data wherein the data comprise the electrochemical cell current as a function of time, and (v) determining the at least one electrochemical characteristic of the chemical-mechanical polishing system by analysis of the data.

The invention also provides a method of determining at least one electrochemical characteristic of a electrochemical-mechanical polishing system comprising (a) a substrate and (b) a polishing composition, the method comprising: (i) providing an electrochemical cell comprising (a) a reactive substrate comprising at least one conductive material, (b) an aqueous solution with a conductivity of about 10 µS or more, and (c) an electrode, wherein the reactive substrate and the electrode are in fluid communication with the aqueous solution, (ii) applying a first potential between the reactive substrate and the electrode wherein the first potential has a value such that substantially no current flows between the reactive substrate and the electrode, (iii) changing the first potential to a second potential, wherein the second potential is greater than the first potential, such that a current is generated between the reactive substrate and the electrode, (iv) collecting data wherein the data comprise the electrochemical cell current as a function of time, and (v) determining the at least one electrochemical characteristic of the electrochemical-mechanical polishing system by analysis of the data.

The invention further provides an electrochemical-mechanical polishing apparatus comprising (a) a platen that rotates, (b) a carrier that holds a workpiece to be polished, (c) a conductive polishing pad, (d) a first electrode, wherein the conductive polishing pad and the first electrode are electrically connected to means for applying a potential between the first electrode and the conductive polishing pad, (e) an aqueous solution having a conductivity of about 10 μS or more, and (f) a second electrode.

DETAILED DESCRIPTION OF THE INVENTION

Figure 1:
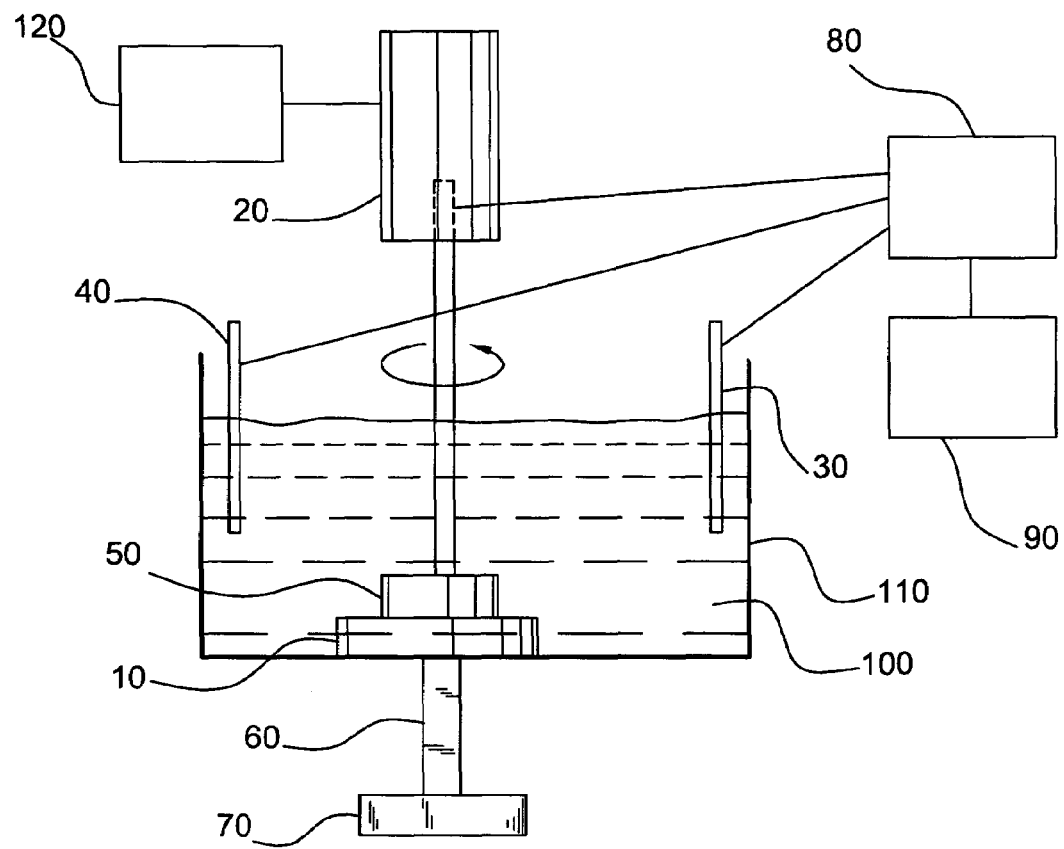
FIG. 1 is a schematic diagram of an electrochemical cell for use in the context of the present invention.

This invention pertains to a method for determining at least one electrochemical characteristic of a chemical-mechanical or electrochemical-mechanical polishing system comprising a reactive substrate and an aqueous solution. The method comprises (i) providing an electrochemical cell comprising (a) a reactive substrate comprising at least one conductive material, (b) an aqueous solution with a conductivity of about 10 μS or more, and (c) an electrode, wherein the reactive substrate and the electrode are in fluid communication with the aqueous solution, (ii) applying a first potential between the substrate and the electrode wherein the first potential has a value such that substantially no current flows between the substrate and the electrode, (iii) changing the first potential to a second potential, wherein the second potential is greater than the first potential, such that a current is generated between the reactive substrate and the electrode, (iv) collecting data wherein the data comprise the electrochemical cell current as a function of time, and (v) determining the at least one electrochemical characteristic of the chemical-mechanical polishing system by analysis of the data.

In a chemical-mechanical polishing system, a substrate is polished, or planarized, by a combination of chemical components and mechanical abrasion of the substrate surface. The chemical components react with the surface of the substrate to convert the surface of the substrate to a softer or more readily abradable form or to convert the surface of the substrate to a soluble form. In an electrochemical-mechanical polishing system, an electrochemical potential is applied to the reactive substrate to remove conductive materials from the surface of the reactive substrate by electrochemical dissolution. Chemical-mechanical polishing and electrochemical-mechanical polishing, although conceptually similar, are regarded in the art as separate technologies with differing requirements. The discussion that follows is to be construed to apply to both chemical-mechanical and electrochemical-mechanical embodiments of the invention, except as where expressly noted herein.

The reactive substrate can be any suitable reactive substrate comprising at least one conductive material. The at least one conductive material desirably will be on the surface of the reactive substrate and preferably will form at least one surface of the reactive substrate. The reactive substrate preferably comprises a metal (e.g., copper, tantalum, tantalum nitride, titanium, titanium nitride, aluminum, nickel, nickel-phosphorous, platinum, ruthenium, iridium, tungsten, tungsten nitride, or rhodium) layered over a patterned substrate comprising a suitable dielectric material (e.g., silicon dioxide, doped silicon, silicon dioxide, and the like), wherein the pattern defines electrical circuits. In another embodiment, the reactive substrate can comprise a suitable underlying dielectric material having a first layer comprising a first metal or metal compound, and having a second layer comprising a second metal or metal compound in continuous contact with the first layer. Non-limiting examples of a suitable second metal or metal compound include titanium, titanium nitride, tantalum, tantalum nitride, tungsten, tungsten nitride, and tungsten alloy. In still another embodiment, the substrate can comprise a layer comprising a metal compound on a surface of a reactive substrate comprising any suitable material. A non-limiting example of such a reactive substrate can be a Ni—P coated aluminum disk.

The reactive substrate can have a non-zero conductivity, such that an electric current can be passed through the reactive substrate by including any portion of the substrate into an electric circuit. When a reactive substrate has a low conductivity, an electric circuit can be completed by contacting at least one portion of a conductive material on a surface of the substrate.

The electrode is made of an electrically conductive material. Desirably, the electrically conductive material is substantially unreactive with the components of the aqueous solution so that any reaction of the electrode with the aqueous solution will not add a component of error to the measurements. The electrode can have any suitable shape, such as cylindrical or planar. In some embodiments, the electrode can be in the form of a mesh so as to maximize surface area. In addition, a reference electrode, such a silver/silver chloride, saturated calomel, mercury/mercurous sulfate, or hydrogen electrode, can be provided to obtain provide a reference point for potential determinations.

The reactive substrate and electrode are simultaneously in fluid communication with the aqueous solution. As the aqueous solution is ionically conductive, having a conductivity of about 10 μS or more, an electrical connection is provided between the substrate and electrode through the medium of the aqueous solution. If a reference electrode is included, the reference electrode is also in ionic communication with the same aqueous solution as the substrate and electrode (e.g., either by fluid communication with the aqueous solution or via a salt bridge). The electrode and optional reference electrode may be placed in any position relative to the reactive substrate. In practice, the electrode will be held relatively close to the reactive substrate but in a manner so as not to interfere with the motion of any components of the polishing system that, when in use, are in motion.

In order to increase mass transport of species being oxidized or reduced within the polishing system and to maintain dispersion of any solid particulate matter within the system, it is typically desirable to stir or otherwise agitate the polishing composition. This may be accomplished by providing separate means for stirring or agitation, by rotating or otherwise moving the electrode or optional reference electrode, or, in some embodiments of the invention, by incorporating a member having a polishing surface in contact with the aqueous solution that, when in use, has a motion (e.g., rotational or linear motion).

The inventive method utilizes electrochemical techniques to determine at least one characteristic of a (electro)chemical-mechanical polishing system. Desirably, electrochemical perturbation techniques such as voltammetry and more preferably chronoamperometry can be used in the inventive method. Typically, a potentiostat is used to provide an electrochemical overpotential between the substrate and electrode. A potentiostat is an electronic device for controlling the potential of a working electrode, in this case the reactive substrate, relative to the electrode, further having the capability of measuring the current flow between the reactive substrate and electrode. The potentiostat is electrically connected to the reactive substrate and electrode and, optionally, to a reference electrode. As noted above, the reactive substrate can be electrically connected to the circuit thus formed either by contact with any portion of the reactive substrate, or by connection to a conductive material component of the reactive substrate. Although in some embodiments the reactive substrate comprises a dielectric layer, the dielectric layer can have a sufficient conductivity to complete a circuit with the conductive material of the reactive substrate. For example, some doped silicon dielectric materials have a conductivity sufficiently large enough to allow passage of current through the dielectric and thereby complete a circuit including the conductive material of the reactive substrate.

FIG. 1 is a schematic illustration of an electrochemical cell used in one embodiment of the present invention. In FIG. 1, a reactive substrate 50 is rotated by a motor drive 20 while pressed against a surface of a member 10. A device 60 provides a controlled pressure (e.g., downforce) of the member 10 against the reactive substrate 50 with measurement device 70 providing for measurement of the magnitude of the pressure. Electrode 30, reference electrode 40, and the reactive substrate 50 are connected electrically to potentiostat 80 which in turn is connected to a computer 90 for analysis of collected data and for control of potentiostat 80. Reactive substrate 50, member 10, electrode 30, and reference electrode 40 are immersed in the aqueous solution 100 maintained in container 110. The motor drive 20 is controlled by a control unit 120.

In operation of the embodiment of FIG. 1, a first potential is established by the use of potentiostat 80 between the reactive substrate 50 and the electrode 30 so as to provide an open cell potential such that substantially no current flows from reactive substrate 50 to electrode 30. Any suitable potentiostat can be utilized, such as the EGG Model 273A potentiostat available from Princeton Applied Research. A conductive material, such as a metal, when placed into a conductive medium capable of establishing an oxidation-reduction system, will typically have a potential difference with other components of the system. Thus, the metal can undergo oxidation due to the potential difference, and the metal surface is affected by the measurement process itself. Application of a potential between the reactive substrate and the electrode will balance the oxidation-reduction potential so that there will be no current flow in the oxidation-reduction system consisting of the reactive substrate and the electrode to prevent chemistry from occurring before the start of the measuring process. However, it is not necessary to establish the first potential using potentiostat 80 or by any other means. In some embodiments, the first potential can be the potential that occurs between the reactive substrate and the electrode when in fluid communication with the aqueous solution without application of an external potential.

A second potential is then applied between the reactive substrate and electrode as a step potential, wherein the second potential is more positive or negative than the first potential. Typically, the second potential is at least about 10 µV (e.g., at least about 1 mV, about 10 mV, about 50 mV, or about 100 mV) more positive or more negative than the first potential and is applied quickly, as a step change.

Figure 2:
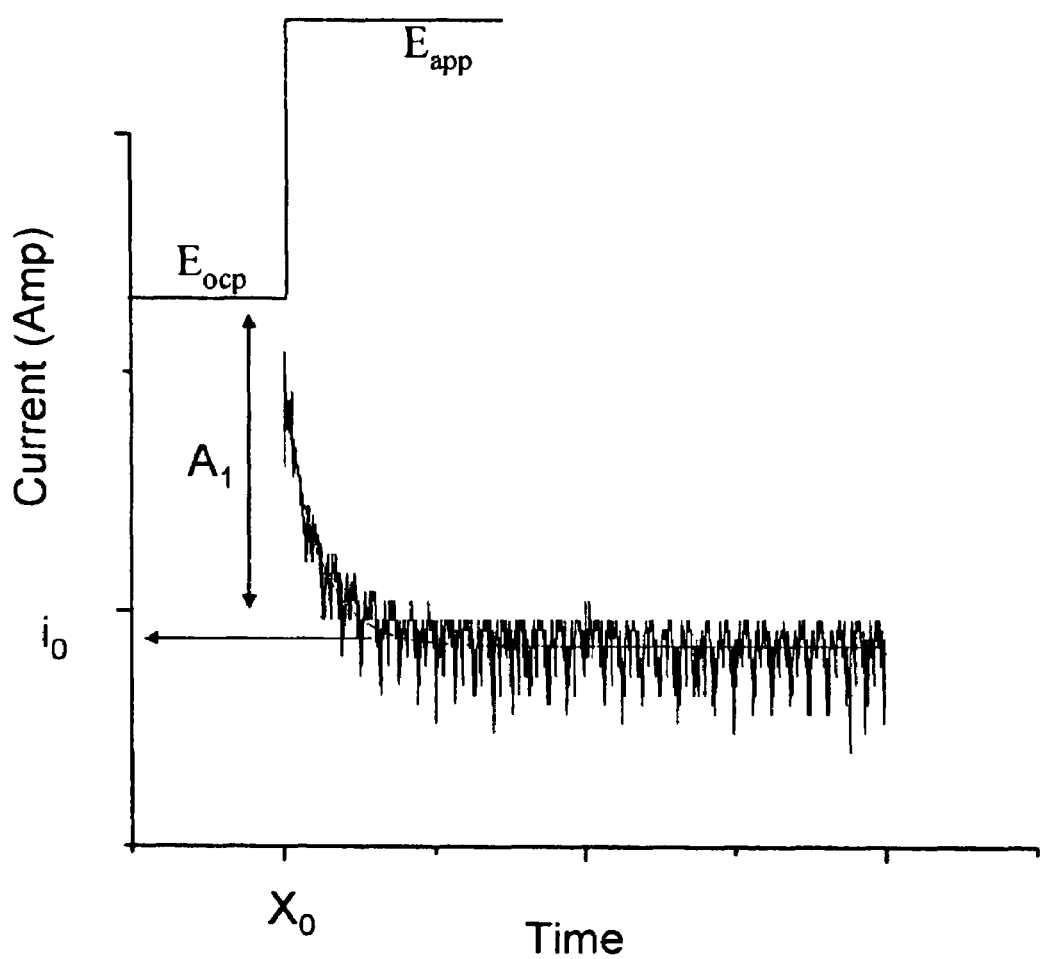
FIG. 2 is a chronoamperogram of current (amp) versus time obtained by the method of the present invention.

A current flow passes from reactive substrate 50 to electrode 30 and is measured as a function of time by potentiostat 80 to provide a chronoamperogram. A typical chronoamperogram is illustrated in FIG. 2. At time $X_0$, the first potential $E_{ocp}$ is changed to the second potential $E_{app}$. The current changes from essentially zero to a nonzero value, and then decays over time following an exponential function to a steady state current $i_0$. The largest value of current observed is referred to a maximum current (e.g., peak current).

The current as a function of time can be represented by the equation $i=i_0+A_1 \exp(-t/t_d)$ wherein i=measured current, $i_0$=stable current after exponential decay, $A_1$=total magnitude of current decay, t=time, and $t_d$=rate constant of current decay.

The data provide information that comprises current at a specific moment in time and that further comprises current as a function of time. By use of any suitable curve-fitting technique, several electrochemical characteristics of the (electro)chemical-mechanical polishing systems can be extracted from the data. Non-limiting examples of extractable electrochemical characteristics include exponential decay, total magnitude of current decay, rate constant of current decay, maximum current, slope of fitting, half decay time constant (e.g., $t_{1/2}$, $t_{1/4}$, and $t_{1/8}$), stable current after exponential decay, and slope of log fitting. The data desirably are collected and analyzed using a software program running on a computer 90. An example of a suitable software program is Power Suite available from Princeton Applied Research.

The chronoamperogram provides information about the chemistry occurring at the surface of the reactive substrate. For example, when the reactive substrate comprises a metal, application of the second potential will result in oxidation of the reactive substrate to produce electrons which form an electrical current. The presence of additional components in the aqueous solution will typically affect the surface of the reactive substrate and thus affect the values observed for $i_0$, $A_1$, and $t_d$.

The second potential can be maintained for any suitable time. Typically, the second potential will be maintained until a stable value for the current is observed (e.g., until $i_0$ is observed). Although the time required to obtain a stable current value will vary based on the particular reactive substrate examined and on components of the aqueous solution, typically the second potential is maintained for at least about 50 ms (e.g., at least about 75 ms, or at least about 100 ms). After maintaining the second potential for a suitable time period, the first potential can be (re)applied.

The invention provides a method for determining at least one change in at least one electrochemical characteristic of a (electro)chemical-mechanical polishing system. The first potential can be maintained for a suitable time period, after which the second potential is applied, and at least one electrochemical characteristic of the polishing system is determined. The first potential can be (re)applied, and the process repeated to determine at least one electrochemical characteristic at a later time point. In this manner, successive determinations of at least one electrochemical characteristic of the (electro)chemical-mechanical polishing system can be obtained to observe the polishing system over time.

The electrochemical cell can further comprise a member having a polishing surface. The polishing surface can be any suitable polishing surface. For example, the polishing surface can be a polishing pad. Suitable polishing pads include, for example, woven and non-woven polishing pads. Moreover, the polishing pad can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof. The reactive substrate desirably is moved relative to the polishing surface. The reactive substrate and the polishing surface can each be in motion or held stationary, provided that at least one of the reactive substrate and polishing surface is in motion. The motion can be rotational, linear, or elliptical.

The aqueous solution can be any suitable chemical-mechanical polishing composition or electrochemical-mechanical polishing composition. Many chemical-mechanical and electrochemical-mechanical polishing compositions are described in the art of substrate polishing.

The aqueous solution optionally comprises an abrasive. Any suitable abrasive can be used, many of which are well known in the art. Preferably, the abrasive is a metal oxide. The metal oxide abrasive desirably is selected from the group consisting of alumina, ceria, germania, magnesia, silica, titania, zirconia, co-formed products thereof, and combinations thereof. The abrasive particles typically have an average particle size (e.g., average particle diameter) of about 20 nm to about 500 nm. Preferably, the abrasive particles have an average particle size of about 70 nm to about 300 nm (e.g., about 100 nm to about 200 nm).

Any suitable amount of abrasive can be present in the aqueous solution. Typically, about 0.001 wt. % or more abrasive can be present in the aqueous solution. The amount of abrasive in the aqueous solution preferably will not exceed about 10 wt. %, and more preferably will not exceed about 5 wt. % (e.g., will not exceed about 2 wt. %).

The abrasive can be affixed to the polishing surface. Numerous methods are known in the art for affixing abrasives to a polishing surface. A polishing surface having an affixed abrasive can be used alone or in combination with abrasive particles suspended in the aqueous solution.

The aqueous solution optionally comprises an oxidizing agent. The oxidizing agent can be any suitable oxidizing agent and can be present in any suitable amount in the aqueous solution. Suitable oxidizing agents include inorganic and organic per-compounds, bromates, bromites, nitrates, chlorates, chlorites, hypochlorites, chromates, iodates, iron and copper salts (e.g., nitrates, sulfates, ethylenediaminetetraacetic acid (EDTA), and citrates), cerium salts, rare earth and transition metal oxides (e.g., osmium tetraoxide), potassium ferricyanide, potassium dichromate, iodic acid, and the like. A per compound (as defined by Hawley's Condensed Chemical Dictionary) is a compound containing at least one peroxy group (—O—O—) or a compound containing an element in its highest oxidation state. Examples of compounds containing at least one peroxy group include but are not limited to hydrogen peroxide and its adducts such as urea hydrogen peroxide and percarbonates, organic peroxides such as benzoyl peroxide, peracetic acid, and di-tert-butyl peroxide, monopersulfates, dipersulfates, and sodium peroxide. Examples of compounds containing an element in its highest oxidation state include but are not limited to periodic acid, periodate salts, perbromic acid, perbromate salts, perchloric acid, perchlorate salts, perboric acid, perborate salts, and permanganates. The oxidizing agent preferably is selected from the group consisting of selected from the group consisting of bromates, bromites, chlorates, chlorites, hydrogen peroxide, hypochlorites, iodates, monoperoxy sulfate, monoperoxy sulfite, monoperoxyphosphate, monoperoxyhypophosphate, monoperoxypyrophosphate, organo-halo-oxy compounds, periodates, permanganate, peroxyacetic acid, and mixtures thereof. The oxidizing agent preferably is hydrogen peroxide. The amount of oxidizing agent present in the aqueous solution typically is about 10 wt. % or less (e.g., about 3 wt. % or less, or about 1 wt. % or less) of the aqueous solution.

Optionally, the aqueous solution comprises a complexing agent. The complexing agent is any suitable chemical additive that enhances the removal rate of the material being removed from the reactive substrate.

Suitable chelating or complexing agents can include, for example, carbonyl compounds (e.g., acetylacetonates, and the like), simple carboxylates (e.g., acetates, aryl carboxylates, and the like), carboxylates containing one or more hydroxyl groups (e.g., glycolates, lactates, gluconates, gallic acid and salts thereof, and the like), di-, tri-, and poly-carboxylates (e.g., oxalates, phthalates, citrates, succinates, tartrates, malates, edetates (e.g., dipotassium EDTA), mixtures thereof, and the like), carboxylates containing one or more sulfonic and/or phosphonic groups, and the like. Suitable chelating or complexing agents also can include, for example, di-, tri-, or polyalcohols (e.g., ethylene glycol, pyrocatechol, pyrogallol, tannic acid, and the like) and amine-containing compounds (e.g., ammonia, amino acids, amino alcohols, di-, tri-, and polyamines, and the like). The choice of suitable chelating or complexing agents will depend on the type of substrate (e.g., the type of metal) being polished. It will be appreciated that many of the aforementioned compounds can exist in the form of a salt (e.g., a metal salt, an ammonium salt, or the like), an acid, or as a partial salt. For example, citrates include citric acid, as well as mono-, di-, and tri-salts thereof. Preferably the complexing agent is an organic acid selected from the group consisting of monocarboxylic acids, dicarboxylic acids, polycarboxylic acids, amino acids, and combinations thereof. Suitable complexing agents include, but are not limited to, complexing agents selected from the group consisting of acetic acid, citric acid, lactic acid, malic acid, malonic acid, oxalic acid, polyacrylic acid, tartaric acid, alanine, glycine, and combinations thereof.

The aqueous solution optionally comprises a corrosion inhibitor (i.e., film-forming agent). The corrosion inhibitor can be any suitable corrosion inhibitor and can be present in the aqueous solution in any suitable amount. Typically, the corrosion inhibitor is an organic compound containing a heteroatom-containing functional group. For example, the corrosion inhibitor is a heterocyclic organic compound with at least one 5- or 6-member heterocyclic ring as the active functional group, wherein the heterocyclic ring contains at least one nitrogen atom. Preferably, the corrosion inhibitor is selected from the group consisting of 1,2,3-triazole, 1,2,4-triazole, benzotriazole, benzimidazole, benzothiazole, and mixtures thereof.

In embodiments comprising an electrochemical-mechanical polishing system, an electrical potential can be applied to the reactive substrate that is different from and independent from the electric potential applied in the electrochemical cell in the context of the invention. An electrochemical overpotential is applied between a surface of the reactive substrate comprising a conductive material and a second electrode in contact with the aqueous solution. As noted above, the electrical circuit can be completed by contact of the electric circuit with any portion of any surface of the reactive substrate, or by contact with a surface of the reactive substrate comprising a conductive material.

The at least one electrochemical cell characteristic can be used to determine at least one polishing characteristic of the (electro)chemical-mechanical polishing system, including but not limited to polishing rate and planarization efficiency. The polishing rate refers to the rate of removal of a material from the surface of the substrate, usually expressed in terms of units of length (thickness)/time. Planarization efficiency relates to step height reduction versus amount of conductive material removed from the substrate. When a reactive substrate comprises an underlying patterned substrate coated with a layer of a conductive material, typically the surface of the conductive material is not smooth but rather conforms to the underlying topography. Thus, a polishing surface first contacts the "high points" of the surface and must remove material in order to form a planar surface. A process that results in achieving a planar surface with less removal of material is considered to be more efficient than a process requiring removal of more material to achieve planarity.

The inventive methods can be used to obtain at least one electrochemical cell characteristic for any (electro)chemical-mechanical polishing system during use of the (electro)mechanical polishing system. A process of (electro)chemical-mechanical polishing can be carried out, and at least one polishing characteristic of the (electro)chemical-mechanical polishing system (e.g., polishing rate or planarization efficiency) can be subsequently determined by any suitable method. One variable of the (electro)chemical-mechanical polishing system can be changed (e.g., an oxidizing agent, chelating agent, or corrosion inhibitor), and the at least one electrochemical cell characteristic and polishing characteristic for the second (electro)mechanical polishing system similarly determined. Further such determinations allows a correlation of at least one electrochemical cell characteristic with at least one polishing characteristic of the (electro)mechanical polishing system. The at least one electrochemical cell characteristic can be determined at any suitable time during the (electro)chemical-mechanical polishing cycle. Thus, determination of at least one electrochemical cell characteristic for an (electro)chemical-mechanical polishing system allows for a prediction of at least one polishing characteristic of the (electro)chemical-mechanical polishing system.

The inventive methods can be used to determine at least one substrate polishing endpoint. The at least one polishing endpoint can be any suitable endpoint. Typically, a polishing endpoint is achieved when a layer of a substrate is substantially removed. When the surface of the substrate is thus altered, at least one electrochemical cell constant will change. Preferably, the determination of at least one electrochemical characteristic of the polishing system is carried out during the (electro)chemical-mechanical polishing process, thereby allowing for in situ determination of the at least one polishing endpoint.

The invention further provides methods of (electro)chemically-mechanically polishing a substrate. The methods comprise (i) contacting a reactive substrate with a (electro)chemical-mechanical polishing system comprising (a) a polishing surface and (b) an aqueous solution with a conductivity of about 10 μS or more, (ii) moving the polishing surface relative to the reactive substrate with the aqueous solution therebetween, (iii) performing one of the inventive methods of determining a change in at least one electrochemical cell characteristic, and (iv) controlling at least one (electro)chemical-mechanical polishing parameter based on the at least one change in the at least one electrochemical characteristic of the (electro)chemical-mechanical polishing system.

The components of the polishing methods are as described above for the other aspects of the invention. When the polishing method is electrochemical-mechanical polishing, desirably the polishing system does not comprise an oxidizing agent.

Any suitable (electro)chemical-mechanical polishing parameter can be controlled using the change in at least one electrochemical cell characteristic of the (electro)chemical-mechanical polishing system. In certain embodiments, the downforce applied to the reactive substrate by the polishing surface can be changed. In other embodiments, the composition of the aqueous solution can be changed. For example, additional components can be added to the aqueous solution when a change in at least one electrochemical cell characteristic is observed. In still further embodiments, the aqueous solution can be changed to a second aqueous solution. The ordinarily skilled artisan will fully appreciate the changes to the (electro)chemical-mechanical polishing system that may be desirably employed.

The inventive methods can be carried out using any suitable apparatus. A preferred apparatus for performing the inventive methods is an electrochemical-mechanical polishing apparatus comprising (a) a platen that rotates, (b) a carrier that holds a workpiece to be polished, (c) a conductive polishing pad, (d) a first electrode, wherein the conductive polishing pad and the first electrode are electrically connected to means for applying a potential between the first electrode and the conductive polishing pad, (e) an aqueous solution having a conductivity of about 10 μS or more, and (f) a second electrode. The first electrode can be used in conjunction with a reference electrode, or the first electrode can also be a reference electrode.

The conductive polishing pad can itself comprise a conductive material, or the pad can comprise pores which absorb the aqueous solution having a conductivity, which aqueous solution acts as a conductive material. The function of the conductive polishing pad is to provide electrical contact between the reactive substrate and means for applying a potential (e.g., an electrochemical overpotential) between the first electrode and the conductive polishing pad. In the practice of one embodiment, with reference to FIG. 1, the conductive pad is placed between member 10 and reactive substrate 50. The member 10 can be a platen of a CMP apparatus.

Since the conductive polishing pad provides an electrical connection to a reactive substrate, in conjunction with the first electrode, the apparatus provides an electric circuit. When a workpiece (e.g., reactive substrate) is placed in the carrier of the apparatus and contacted with a conductive polishing pad, a potential can be applied between the first electrode and the conductive polishing pad, and thus between the first electrode and the reactive substrate. A reactive substrate can undergo oxidation due to the presence of the potential. A thin aqueous film can provide the electrical connection.

The potential can be applied to the substrate by any suitable means. The first electrode and the conductive polishing pad typically are connected to a power source and an electric potential or bias is applied to the first electrode and the conductive polishing pad so that a potential is applied to the substrate. The power supply can be adapted to apply a constant current or constant potential to the electrodes and the substrate. In certain embodiments, a constant current can be applied to the electrodes and/or substrate for a first period of time, and then a constant potential can be applied to the electrodes and/or substrate for a second period of time. In such embodiments, the steps of applying a constant current and constant potential to the substrate can be performed in any suitable order. The electric potential applied to the electrodes and/or substrate can be constant or can be varied over time (i.e., a time-varying potential). The apparatus can further comprise a lock-in amplifier. A lock-in amplifier provides the step potential at a set frequency.

A second potential can be independently applied between the second electrode and the conductive pad. When a workpiece (e.g., reactive substrate) is placed in the carrier of the apparatus and contacted with a conductive polishing pad, a potential can be applied between the second electrode and the conductive pad, and thus between the second electrode and the reactive substrate. The second electrode desirably is used in one of the inventive methods of determining at least one electrochemical characteristic of the (electro)chemical-mechanical polishing system.

The examples further illustrate the invention but, of course, should not be construed as in any way limiting its scope.

EXAMPLE 1

This example demonstrates application of the inventive method in the determination of the correlation of stable current after exponential decay with the removal rate for a reactive substrate consisting of copper.

Similar substrates consisting of copper were polished using a Pine rotating disk system with polishing compositions comprising 3 wt. % colloidal silica and 1.5 wt. % hydrogen peroxide in water at a pH of 8.0. The polishing compositions further comprised as a complexing agent, glycolic acid, succinic acid, malonic acid, and tartaric acid each at three different concentrations of 0.08 M, 0.14 M, and 0.20 M, or oxalic acid or phthalic acid as a complexing agent, each at three different concentrations of 0.04 M, 0.8 M, and 0.14 M, for a total of 18 different polishing compositions. The polishing parameters were as follows: 9.0 kPa (1.3 psi) downforce, 65 rpm carrier speed, 69 rpm platen speed, 160 mL/min polishing composition flow rate, and use of a hard polyurethane polishing pad. A PAR 273A potentiostat from Princeton Applied Research was used for the chronoamperometric measurements, and the resultant data were analyzed using PowerSuite software from Princeton Applied Research. The step potential was 50 mV with a potential rise time of 4 ms. The electrochemical cell characteristic determined was the stable current after exponential decay ($i_o$). After polishing, the copper removal rate in Å/min was determined. The results are set forth in graphical form in FIG. 3 as a plot of $i_o$ (0.1 mA) versus copper removal rate (Å/min).

Figure 3:
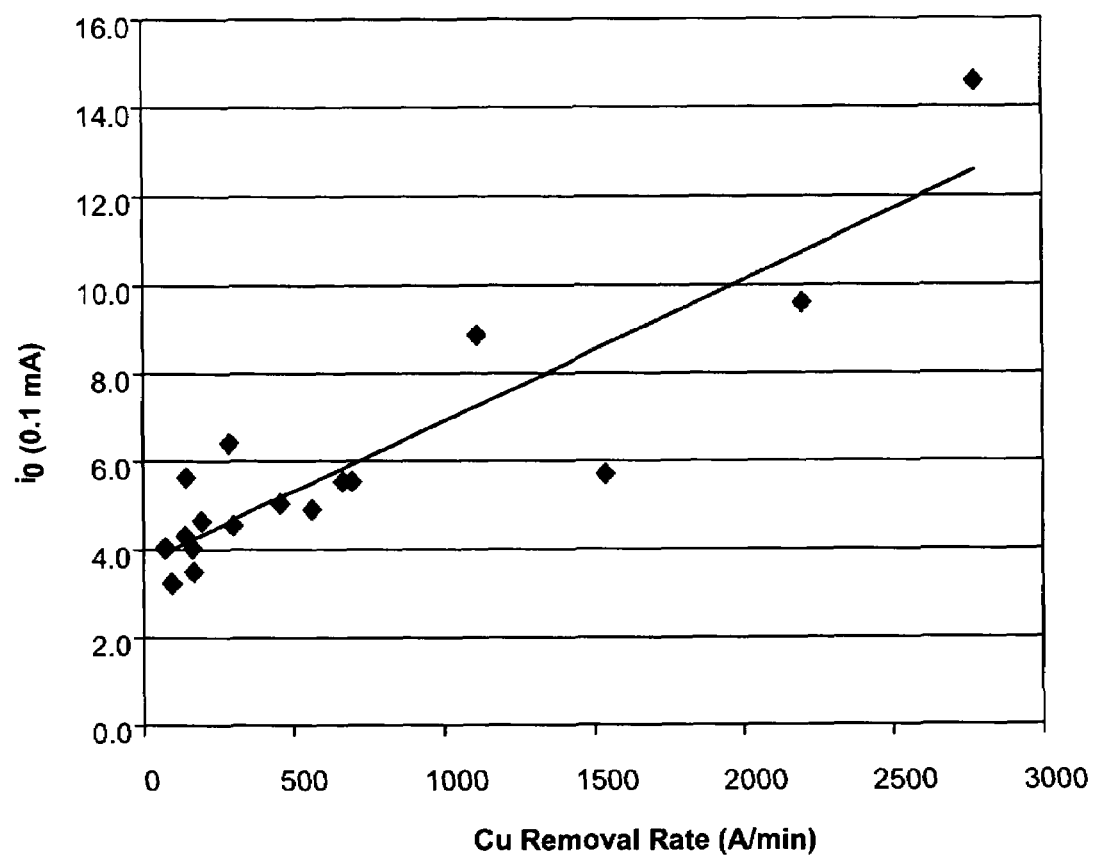
FIG. 3 is a graph of stable current (0.1 mA) after exponential decay versus copper removal rate (Å/min).

As is apparent from the results set forth in FIG. 3, there is a linear correlation between the observed $i_o$ and copper removal rate. The data can be expressed by the equation $i_o=0.0032x+3.71$, wherein $i_o$=stable current after exponential decay in units of 0.1 mA and x=copper removal rate in units of Å/min, with the data having a correlation coefficient ($R^2$) of 0.81. Therefore, determination of the electrochemical cell characteristic of stable current after exponential decay ($i_o$) for polishing compositions of the Example can allow for prediction of the copper removal rate that can be achieved with such polishing compositions.

EXAMPLE 2

This example illustrates an embodiment of the invention for the determination of a polishing endpoint in the polishing of a substrate. Two separate substrates were polished using a Pine rotating disk system with a polishing composition comprising 1 wt. % alumina, 1 wt. % tartaric acid, 500 ppm 1,2,4-triazole, 100 ppm benzotriazole, and 1 wt. % hydrogen peroxide at a pH of 8.1 in water. The polishing parameters were a carrier speed of 500 rpm, 10.4 kPa (1.5 psi) downforce, and use of a hard polyurethane polishing pad. A PAR 273A potentiostat from Princeton Applied Research was used for the chronoamperometric measurements, and the resultant data were analyzed using PowerSuite software from Princeton Applied Research. The step potential was 50 mV with a potential rise time of 4 ms. The electrochemical cell characteristic determined was the maximum current.

The maximum current observed for the substrate comprising copper was approximately 0.12 mA, whereas the maximum current observed for the substrate comprising tantalum was approximately 13 mA. Therefore, the maximum current observed using a method of the invention can distinguish a substrate comprising copper and a substrate comprising tantalum Determination of maximum current in the chemical-mechanical polishing of a substrate comprising a layer of copper over tantalum can thus distinguish the layer being polished on a millisecond time scale, allowing for a determination of the polishing endpoint.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of determining at least one electrochemical characteristic of a chemical-mechanical polishing system comprising (a) a reactive substrate and (b) an aqueous solution, the method comprising:
   (i) providing an electrochemical cell comprising:
      (a) a reactive substrate comprising at least one conductive material,
      (b) an aqueous solution with a conductivity of about 10 µS or more, and
      (c) an electrode,
         wherein the reactive substrate and the electrode are in fluid communication with the aqueous solution, and wherein a first potential exists between the reactive substrate and the electrode,
   (ii) changing the first potential to a second potential, wherein the second potential is different than the first potential, such that a current is generated between the reactive substrate and the electrode, (iii) collecting data wherein the data comprise an electrochemical cell current, (iv) determining the at least one electrochemical characteristic of the chemical-mechanical polishing system by analysis of the data, and (v) determining at least one polishing characteristic of the chemical-mechanical polishing system using the at least one electrochemical characteristic of the chemical-mechanical polishing system, wherein the at least one electrochemical characteristic of the chemical-mechanical polishing system is selected from the group consisting of stable current, total magnitude of current reduction, maximum current, and time constant of current reduction.

2. The method of claim 1, wherein the chemical-mechanical polishing system further comprises a polishing surface, and the polishing surface is moved relative to the reactive substrate with the aqueous solution therebetween.

3. The method of claim 1, wherein the data comprises an electrochemical cell current as a function of time.

4. The method of claim 1, wherein the at least one electrochemical characteristic of the chemical-mechanical polishing system is stable current.

5. The method of claim 1, wherein the at least one polishing characteristic of the chemical-mechanical polishing system is selected from the group consisting of polishing rate and dishing.

6. The method of claim 1, wherein the at least one polishing characteristic of the chemical-mechanical polishing system is used to determine a substrate polishing endpoint.

7. The method of claim 1, comprising an additional step (vi): changing the second potential to a different potential.

8. The method of claim 1, wherein the reactive substrate is a semiconductor wafer.

9. The method of claim 1, wherein the reactive substrate comprises copper.

10. The method of claim 1, wherein the reactive substrate further comprises tantalum.

11. A method for determining at least one change in at least one electrochemical characteristic of a chemical-mechanical polishing system, the method comprising:

(i) performing the method of claim 1 a first time to determine a first value of at least one electrochemical characteristic of the chemical-mechanical polishing system, (ii) waiting a period of time, (iii) performing the method of claim 1 a second time to determine a second value of the at least one electrochemical characteristic of the chemical-mechanical polishing system, and (iv) comparing the first value and the second value of the at least one electrochemical characteristic of the chemical-mechanical polishing system to determine the at least one change in the at least one electrochemical characteristic of the chemical-mechanical polishing system.

12. A method of chemically-mechanically polishing a substrate comprising:

(i) contacting a reactive substrate with a chemical-mechanical polishing system comprising:

(a) a polishing surface, and (b) an aqueous solution with a conductivity of about 10 $\mu S$ or more, (ii) moving the polishing surface relative to the reactive substrate with the aqueous solution therebetween, (iii) performing the method of claim 11, and (iv) controlling at least one chemical-mechanical polishing parameter based on the at least one change in the at least one electrochemical characteristic of the chemical-mechanical polishing system.

13. The method of claim 12, wherein the at least one change in the at least one electrochemical characteristic of the chemical-mechanical polishing system is selected from the group consisting of stable current, total magnitude of current reduction, maximum current, and time constant of current reduction.

14. The method of claim 12, wherein the at least one chemical-mechanical polishing parameter is selected from the group consisting of a polishing endpoint, downforce of the polishing surface against the substrate, and at least one component of the aqueous solution.

15. The method of claim 12, wherein the reactive substrate comprises copper.

16. The method of claim 12, wherein the reactive substrate comprises tantalum.

17. The method of claim 1, wherein the at least one electrochemical characteristic of the chemical-mechanical polishing system is time constant of current reduction.

18. A method of determining at least one electrochemical characteristic of a electrochemical-mechanical polishing system comprising (a) a reactive substrate and (b) an aqueous solution, the method comprising:

(i) providing an electrochemical cell comprising:

(a) a reactive substrate comprising at least one conductive material, (b) an aqueous solution with a conductivity of about 10 $\mu S$ or more, and (c) an electrode, wherein the reactive substrate and the electrode are in fluid communication with the aqueous solution, and wherein a first potential exists between the reactive substrate and the electrode, (ii) applying a first potential between the reactive substrate and the electrode, (iii) changing the first potential to a second potential, wherein the second potential is different than the first potential, such that a current is generated between the reactive substrate and the electrode, (iv) collecting data wherein the data comprise the electrochemical cell current, and (v) determining the at least one electrochemical characteristic of the electrochemical-mechanical polishing system by analysis of the data, wherein the at least one electrochemical characteristic of the electrochemical-mechanical polishing system is selected from the group consisting of stable current, total magnitude of current reduction, maximum current, and time constant of current reduction.

19. The method of claim 18, wherein the electrochemical-mechanical polishing system further comprises a polishing surface, and the polishing surface is moved relative to the substrate with the aqueous solution therebetween.

20. The method of claim 18, wherein the data comprises an electrochemical cell current as a function of time.

21. The method of claim 18, wherein the at least one electrochemical characteristic of the electrochemical-mechanical polishing system is stable current.

22. The method of claim 18, further comprising the step of determining at least one polishing characteristic of the electrochemical-mechanical polishing system using the at least one electrochemical characteristic of the electrochemical-mechanical polishing system.

23. The method of claim 22, wherein the at least one polishing characteristic of the electrochemical-mechanical polishing system is selected from the group consisting of polishing rate and dishing.

24. The method of claim 22, wherein the at least one polishing characteristic of the electrochemical-mechanical polishing system is a substrate polishing endpoint.

25. The method of claim 18, comprising an additional step: (viii) changing the second potential to the first potential.

26. The method of claim 18, wherein the reactive substrate is a semiconductor wafer.

27. The method of claim 18, wherein the reactive substrate comprises copper.

28. The method of claim 18, wherein the reactive substrate comprises tantalum.

29. A method for determining at least one change in at least one electrochemical characteristic of an electrochemical-mechanical polishing system, the method comprising:
   (i) performing the method of claim 18 a first time to determine a first value of at least one electrochemical characteristic of the electrochemical-mechanical polishing system
   (ii) waiting a period of time,
   (iii) performing the method of claim 18 a second time to determine a second value of the at least one electrochemical characteristic of the electrochemical-mechanical polishing system, and
   (iv) comparing the first value and the second value of the at least one electrochemical characteristic of the electrochemical-mechanical polishing system to determine the at least one change in the at least one electrochemical characteristic of the electrochemical-mechanical polishing system.

30. A method of electrochemically-mechanically polishing a reactive substrate comprising:
   (i) contacting a reactive substrate with an electrochemical-mechanical polishing system comprising:
      (a) a polishing surface, and
      (b) an aqueous solution with a conductivity of about 10 μS or more,
   (ii) moving the polishing surface relative to the reactive substrate with the aqueous solution therebetween,
   (iii) performing the method of claim 29, and
   (iv) controlling at least one electrochemical-mechanical polishing parameter based on the at least one change in the at least one electromechanical characteristic of the electrochemical-mechanical polishing system.

31. The method of claim 30, wherein the at least one electrochemical characteristic of the chemical-mechanical polishing system is stable current.

32. The method of claim 30, wherein the at least one chemical-mechanical polishing parameter is selected from the group consisting of a polishing endpoint, downforce of the polishing surface against the substrate, and at least one component of the aqueous solution.

33. The method of claim 30, wherein the reactive substrate comprises copper.

34. The method of claim 30, wherein the reactive substrate comprises tantalum.

35. The method of claim 30, wherein the at least one electrochemical characteristic of the electrochemical-mechanical polishing system is time constant of current reduction.

36. The method of claim 18, wherein the at least one electrochemical characteristic of the electrochemical-mechanical polishing system is time constant of current reduction.

* * * * *